(12) United States Patent
Monachon

(10) Patent No.: US 11,000,102 B2
(45) Date of Patent: May 11, 2021

(54) GEMSTONE AND METHOD FOR PRODUCING THE SAME

(71) Applicant: Omega SA, Biel/Bienne (CH)

(72) Inventor: Jean-Claude Monachon, Bevaix (CH)

(73) Assignee: Omega SA, Biel/Bienne (CH)

( * ) Notice: Subject to any disclaimer, the term of this patent is extended or adjusted under 35 U.S.C. 154(b) by 0 days.

(21) Appl. No.: 15/917,907

(22) Filed: Mar. 12, 2018

(65) Prior Publication Data

US 2018/0271234 A1    Sep. 27, 2018

(30) Foreign Application Priority Data

Mar. 21, 2017  (EP) ..................................... 17162186

(51) Int. Cl.
  *A44C 17/00* (2006.01)
  *B23K 26/38* (2014.01)
  *A44C 17/04* (2006.01)

(52) U.S. Cl.
  CPC ............ *A44C 17/001* (2013.01); *B23K 26/38* (2013.01); *A44C 17/04* (2013.01)

(58) Field of Classification Search
  CPC ...... A44C 17/00; A44C 17/001; A44C 17/007
  USPC .................. D11/89, 90, 76, 75, 70
  See application file for complete search history.

(56) References Cited

U.S. PATENT DOCUMENTS

| | | | | |
|---|---|---|---|---|
| D242,276 S | * | 11/1976 | Saltzman | D11/90 |
| D242,376 S | * | 11/1976 | Saltzman | D11/90 |
| D244,367 S | * | 5/1977 | Saltzman | D11/90 |
| D352,673 S | * | 11/1994 | Harris | D11/90 |
| D375,914 S | * | 11/1996 | Harris | D11/90 |
| D384,592 S | * | 10/1997 | Siman-Tov | D11/90 |
| D416,510 S | * | 11/1999 | Han | D11/90 |
| D434,341 S | * | 11/2000 | Kavalek | D11/90 |
| 6,158,243 A | * | 12/2000 | Couture | A44C 17/001 63/32 |
| 6,405,562 B1 | | 6/2002 | Zimet et al. | |
| D466,042 S | * | 11/2002 | Cohen | D11/90 |
| D512,934 S | * | 12/2005 | Voorn | D11/90 |

(Continued)

FOREIGN PATENT DOCUMENTS

| | | |
|---|---|---|
| DE | 2 247 790 | 4/1973 |
| EP | 1 110 472 A1 | 6/2001 |

(Continued)

OTHER PUBLICATIONS

European Search Report dated Sep. 5, 2017, issued in European Application EP 17162186.5, filed Mar. 21, 2017 (with English Translation of Categories of Cited Documents).

(Continued)

*Primary Examiner* — Emily M Morgan
(74) *Attorney, Agent, or Firm* — Oblon, McClelland, Maier & Neustadt, L.L.P.

(57) ABSTRACT

A method for producing a gemstone, in particular a diamond, in the shape of a star with several arms, the method including taking a basic, brilliant cut gemstone, the gemstone including a basic crown, a basic pavilion and a basic girdle joining the basic crown and the basic pavilion and defining a plane, cutting a plurality of facets in the respectively basic crown, pavilion and girdle, to obtain a transformed gemstone delimited by a periphery, laser cutting the periphery of the transformed gemstone to produce the star shape.

13 Claims, 8 Drawing Sheets

(56) References Cited

U.S. PATENT DOCUMENTS

| | | | | |
|---|---|---|---|---|
| D589,395 S | * | 3/2009 | Siman-Tov | D11/90 |
| D685,286 S | * | 7/2013 | Bhansali | D11/90 |
| D691,916 S | * | 10/2013 | Stuchlik | D11/90 |
| D695,146 S | * | 12/2013 | Mitchener | D11/90 |
| D766,771 S | * | 9/2016 | Kejejian | D11/90 |
| 2002/0195095 A1 | * | 12/2002 | Fuchs | A44C 17/001 125/30.01 |
| 2003/0192347 A1 | * | 10/2003 | Yaskil | A44C 17/001 63/32 |
| 2004/0213088 A1 | * | 10/2004 | Fuwausa | B60K 37/02 368/228 |
| 2011/0110201 A1 | * | 5/2011 | Boularas | A44C 15/0015 368/285 |
| 2013/0070573 A1 | | 3/2013 | Oshio | |
| 2015/0359303 A1 | * | 12/2015 | Lebreton | A44C 17/02 368/168 |

FOREIGN PATENT DOCUMENTS

| | | |
|---|---|---|
| EP | 2 573 628 A2 | 3/2013 |
| JP | 2001-204520 A | 7/2001 |
| JP | 2011-191303 A | 9/2011 |
| JP | 2015-3665 A | 2/2015 |
| JP | 2016-173361 A | 9/2016 |
| JP | 2017-502260 A | 1/2017 |
| JP | 2020-114417 A | 7/2020 |
| WO | WO 2016/083680 A1 | 6/2016 |

OTHER PUBLICATIONS

Chinese Office Action issued in Chinese Patent Application No. 201810229389.5 dated Aug. 5, 2020 (w/ English Translation).
Japanese Office Action issued in Japanese Patent Application No. 2018-49057 dated Dec. 22, 2020, (w/ English Translation).

* cited by examiner

GEMSTONE AND METHOD FOR PRODUCING THE SAME

This application claims priority from European Patent Application No. 17162186.5 filed on Mar. 21, 2017, the entire disclosure of which is hereby incorporated herein by reference.

FIELD OF THE INVENTION

The present invention relates to the field of cutting stones more particularly intended for use in the field of horology.

BACKGROUND OF THE INVENTION

In high-end watches, it is known to enhance the dial with precious or semi-precious stones, and especially with diamonds. For example, Patent Nos. WO 2014/122296 and EP0257453 disclose dials provided with gemstones having a conventional round shape.

To obtain a particular aesthetic effect, other original shapes may be envisaged. In this regard, U.S. Pat. No. 6,405,562, which discloses a diamond with a girdle having a contour with several lobes, is found in patent literature. However, the dimensions and especially the thickness of these gemstones of original shape disclosed in the prior art are incompatible with arrangement in a dial. Indeed, the maximum thickness will be limited by the dial thickness, assuming that the gemstone extends over the entire thickness of the dial, and by the space available between the dial and the hands to avoid hindering the hand movements. Typically, the total thickness including the dial thickness and the space between the dial and the hour hand, which is closest to the dial, is on the order of a millimetre. To produce original shapes, the challenge is then to cut a gemstone of very small thickness without breaking it, while preserving its properties of brilliance and an attractive aesthetic appearance.

SUMMARY OF THE INVENTION

The present invention thus proposes to produce a gemstone having an original shape, namely a star shape, with a cut that gives the gemstone optimum brilliance and an attractive aesthetic appearance yet remains compatible with setting in a dial.

The present invention further proposes a dial provided with securing means that are virtually invisible to the user and can enhance the gemstone.

To this end, a gemstone, its method of production, the setting intended for setting the gemstone, in addition to a dial and a watch according to the annexed claims are proposed.

BRIEF DESCRIPTION OF THE DRAWINGS

The invention will be described in more detail below with reference to the annexed drawings, given by way of non-limiting example, and in which:

FIG. 1 is a top view. FIG. 2 is a bottom view and FIG. 3 is a side view.

DETAILED DESCRIPTION OF THE INVENTION

The present invention relates to a gemstone and to its method of production. It also relates to the dial furnished with the gemstone and to the securing means implemented to secure the gemstone to the dial. The invention is more particularly described for a diamond, but it may also relate to a precious or semi-precious stone.

Figure 1:
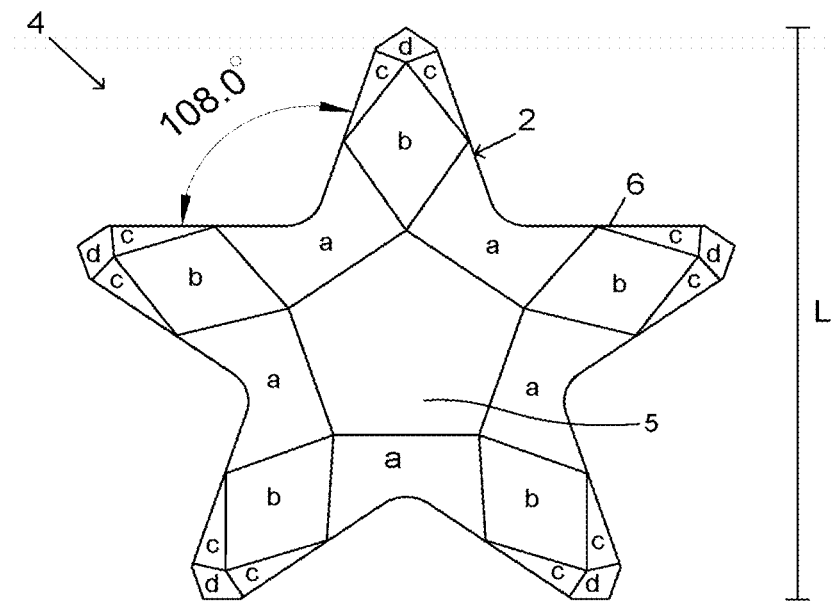
FIGS. 1 to 3 represent different views of the diamond according to the invention.
Figure 3:
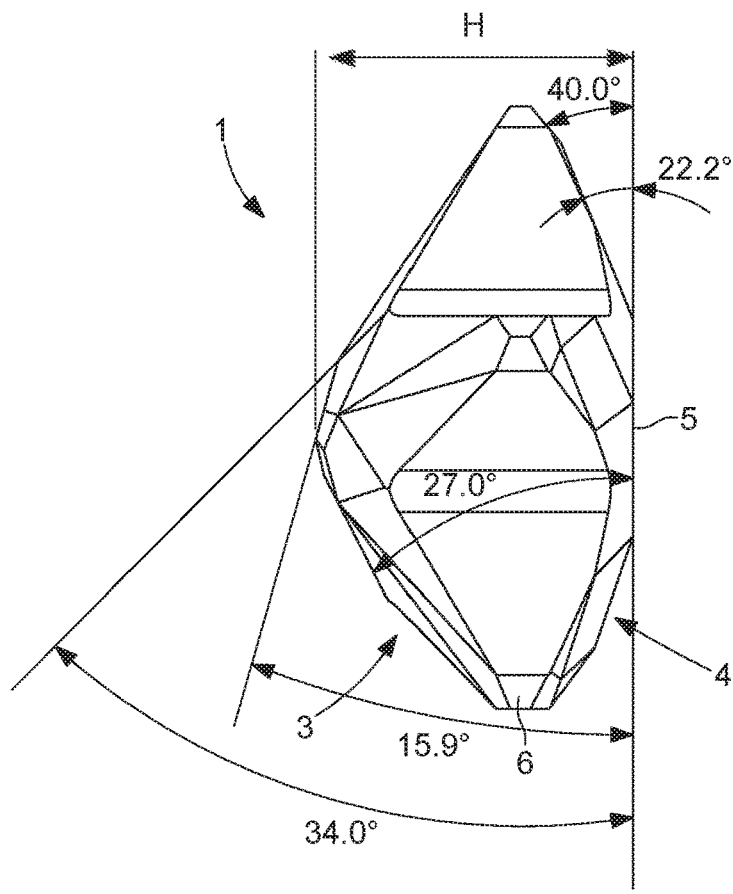

FIGS. 1 and 3 show views of diamond 1 according to the invention. It has a star shape. In the examples, the star comprises five identical arms 2, offset by an angle of 108°, but the present invention does not preclude producing stars with a different number of arms (3, 4, 6. etc.).

The diamond according to the invention comprises a pavilion 3, in which are cut several facets (e, f, g, h), and a crown 4 that is also faceted (a, b, c, d) and surmounted by a table 5. At the junction between the pavilion and the crown, the diamond comprises a girdle 6 whose outline has the shape of a 5 arm star.

In addition to table 5, crown 4 comprises 25 facets (FIG. 1). Table 5 has a pentagonal shape, preferably with five sides of equal length. It is surrounded by a first series of five facets a, which share one of their sides with one side of the pentagon and are connected to girdle 6. The crown comprises a second series of five rhombus facets b, which each share two sides with the adjacent facets a, and a vertex with the pentagon forming the table. It comprises a third series of ten triangular facets c, with each facet c sharing one side with a rhombus facet b and having one side connected to girdle 6. Finally, it comprises a fourth series of five quadrangular facets d forming the end of each arm of the star. For optimum aesthetic effect, the vertex common to the pentagon of table 5 and to facet b, the vertex common to facet b and to facet d and the end of the arm are aligned in the same plane.

According to the invention, the ends of the arms formed by facets d are double beveled in order to facilitate setting without risk of breaking the ends. According to a variant that is not represented, they may, conversely, be cut in a V-shape, the end of the arms then being formed by facets c. In this latter configuration, the number of crown facets is then reduced to 20.

Figure 2:
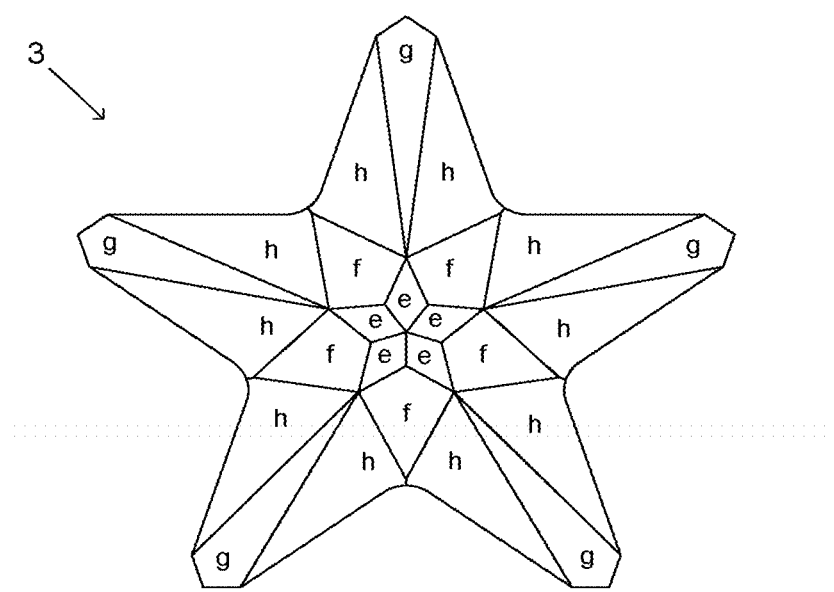

Pavilion 3 seen in FIG. 2 comprises 25 facets. Starting from its centre, pavilion 3 comprises a fifth series of five quadrangular facets e forming a 5 arm star, surrounded by a sixth series of five quadrangular facets f forming a concentric star around the star formed by facets e and offset by 54° with respect thereto. This double star is visible through the table of the crown and offers an attractive visual appearance. The pavilion further comprises a seventh series of five quadrangular facets g, with each facet sharing a vertex with a facet e and extending to the end of an arm. Finally, the pavilion comprises an eighth series of ten triangular facets h, inserted between facets f and g and connected to girdle 6. According to the invention, the centre of the pavilion, the vertex common to facet e and to facet g and the end of one arm are aligned in the same plane.

According to the invention, the height H between the table and the end of the pavilion is less than 2 mm, preferably less than 1.7 mm, more preferentially less than 1.3 mm, even more preferentially less than 1 mm, with a minimum value on the order of 0.5 mm. The length L between one end of an arm and the ends of two opposite arms is comprised between 1 and 3 mm, preferably between 1.2 and 2.5 mm and more preferentially between 1.4 and 1.8 mm. With respect to the plane formed by the table, facets e, f, g and h of the pavilion respectively have angles comprised between 12 and 20°, 23 and 31°, 30 and 38° and between 32 and 40°. Preferably, facets e, f, g and h are respectively oriented at 15.9°, 27°, 34° and 36.1° with respect to the plane formed by the table, facets a, b, c and d respectively have angles comprised between 15 and 23°, 18 and 26°, 24 and 32° and between 36 and 44° with respect to the plane of the table. Preferentially, facets a, b, c and d respectively have angles of 19.3°, 22.2°, 277° and 40°.

Preferably, facets e, f, g and h are respectively oriented at 15.9°, 27°, 34° and 36.1° with respect to the plane formed by the girdle. Facets a, b, c and d respectively have angles comprised between 15 and 23°, 18 and 26°, 24 et 32° and between 36 et 44° with respect to the plane of the girdle. Preferentially, facets a, b, c and d respectively have angles of 19.3°, 22.2°, 27.7° and 40°.

To produce the diamond according to the invention, some of the sequences of the cutting method are illustrated in FIGS. 4 to 9.

The method consists in starting from a brilliant cut round gemstone, which will be referred to as the basic gemstone, in faceting the pavilion, its crown and its girdle to obtain the aforecited facets in a conventional manner by grinding, and then in laser cutting the edge of the transformed gemstone to form the different arms of the star. Preferably, faceting is performed before laser cutting to avoid cutting a gemstone of even further reduced size. The example below starts by cutting the crown facets and then the pavilion facets, but this order could also be reversed.

Figure 4:
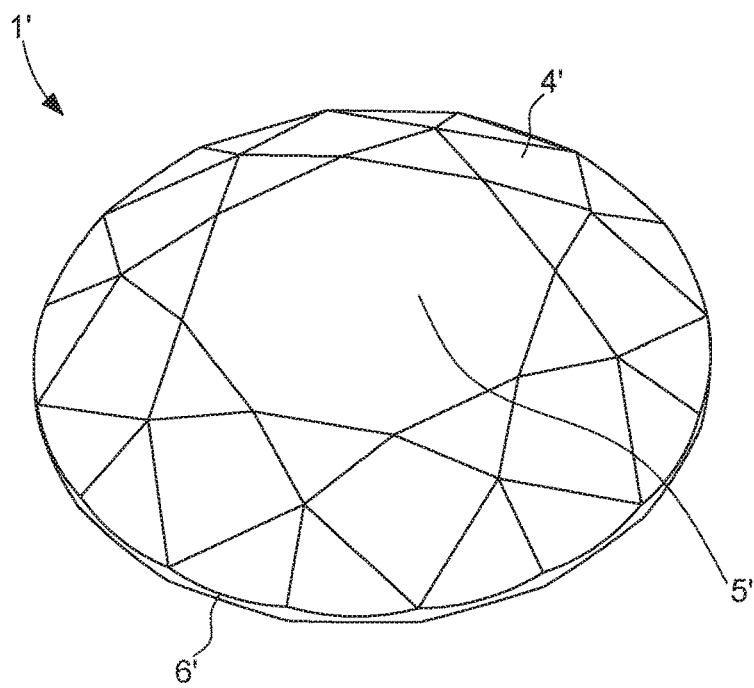
FIGS. 4 to 9 illustrate some sequences of the method for cutting the gemstone according to the invention.
Figure 5:
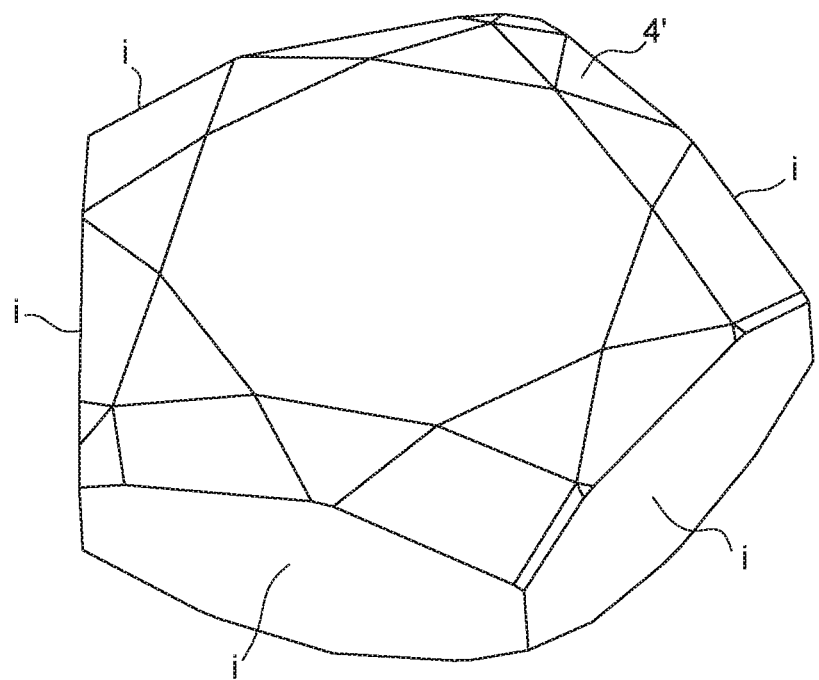
Figure 6:
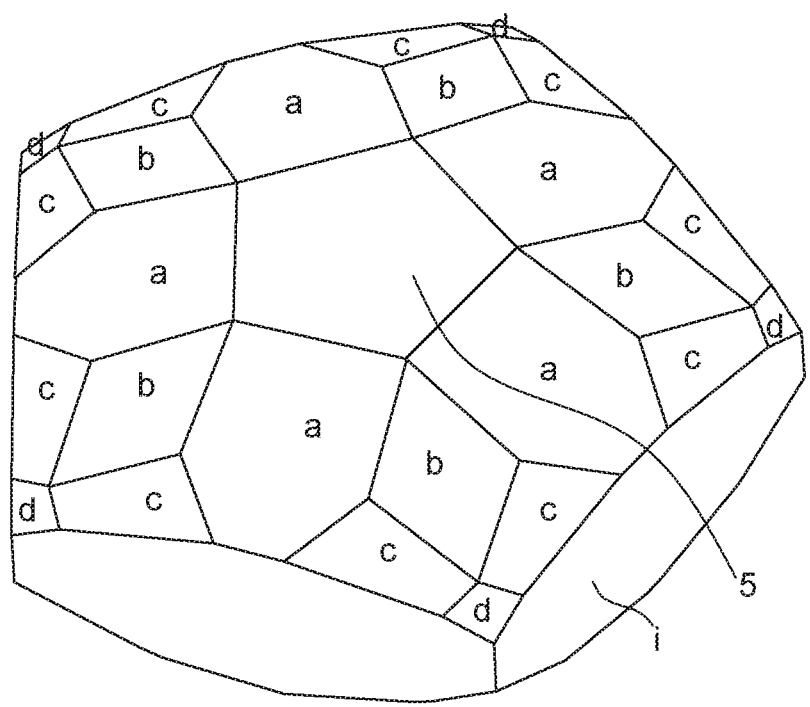
Figure 7:
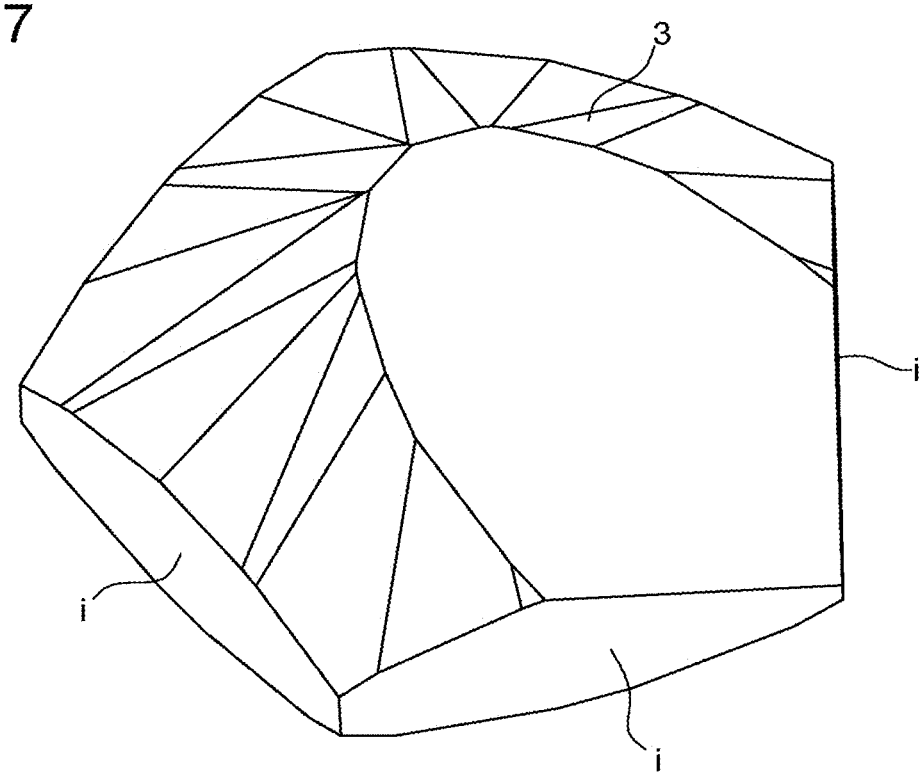
Figure 8:
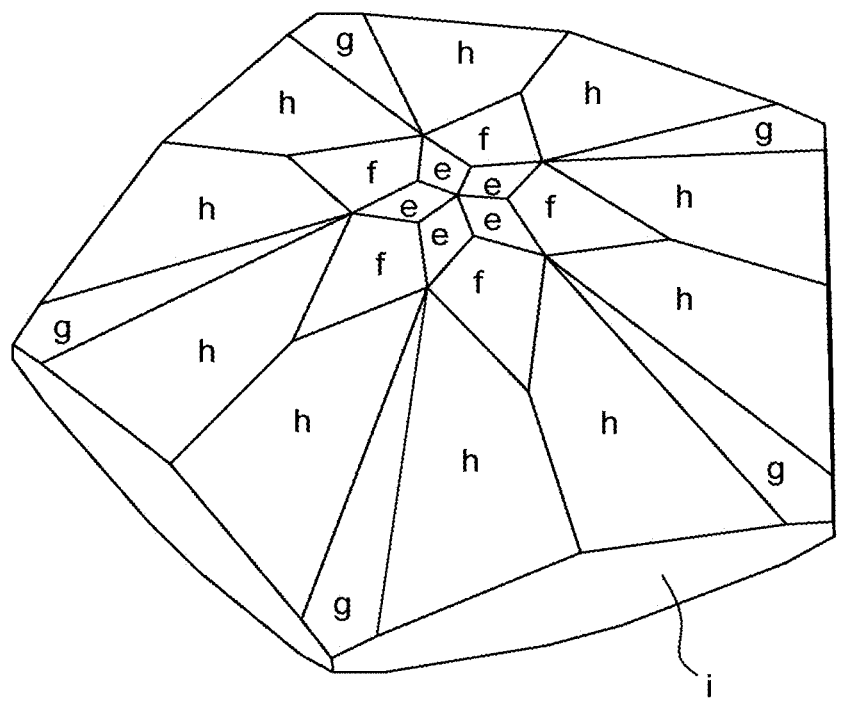
Figure 9:
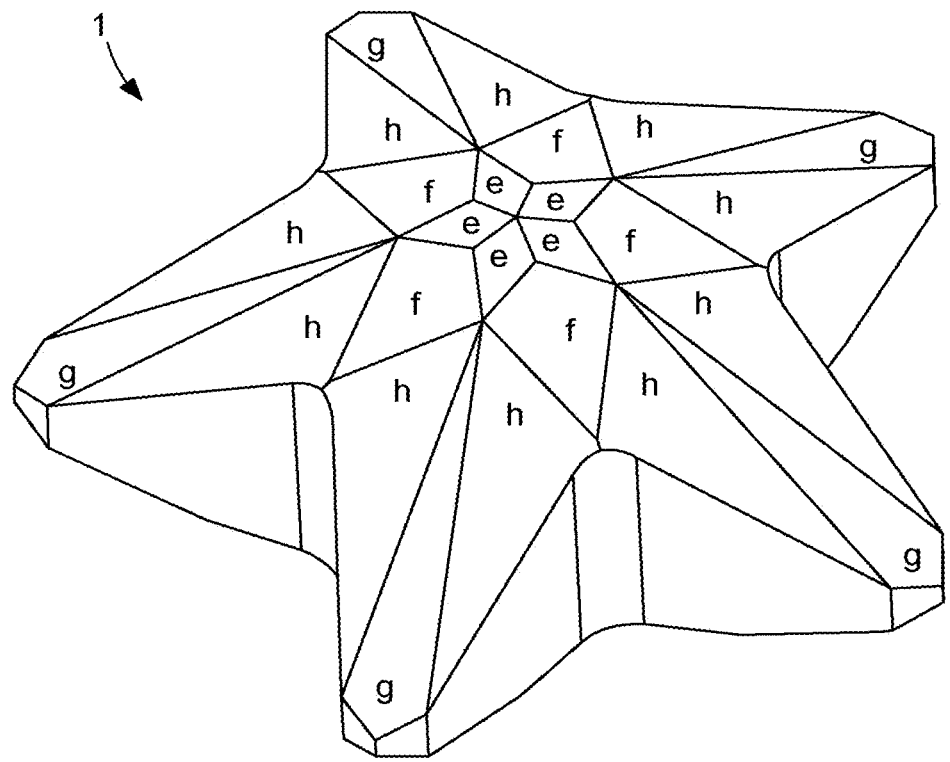

Starting with a brilliant cut diamond 1' whose crown 4' and girdle 6' are seen in FIG. 4, five lateral faces i of the same dimensions and substantially perpendicular to the plane of the girdle are cut over the entire girdle outline (FIG. 5). The edges at the junction between lateral faces i will subsequently form the ends of each of the five arms. Table 5, facets b and optionally facets d, and facets a and c, which will be partially cut in the final laser cutting step, are produced in a few sequences (FIG. 6). Next, the pavilion facets are cut. First of all, the tip of the pavilion, namely the culet, is cut (FIG. 7). Next, facets, e, f and g, and facets h, which will be partially cut in the final laser cutting step, are produced in a few sequences (FIG. 8). In the last step, laser cutting is finalised to produce the star shape (FIG. 9). The material is cut into a V-shape, starting from a vertex of facet g adjacent to its free end up to the height of the outermost vertex of facet f, to finish at the first encountered vertex of neighbouring facet g. Laser cutting is performed in this manner for each lateral face i. The cut may, for example, be performed using a red light laser (625-700 nm). It may be a diode laser or a krypton type gas laser, to cite a few examples. The cut is performed using a few watts of power, more precisely around 6 watts, and at a frequency of 3000 hertz.

Figure 10:
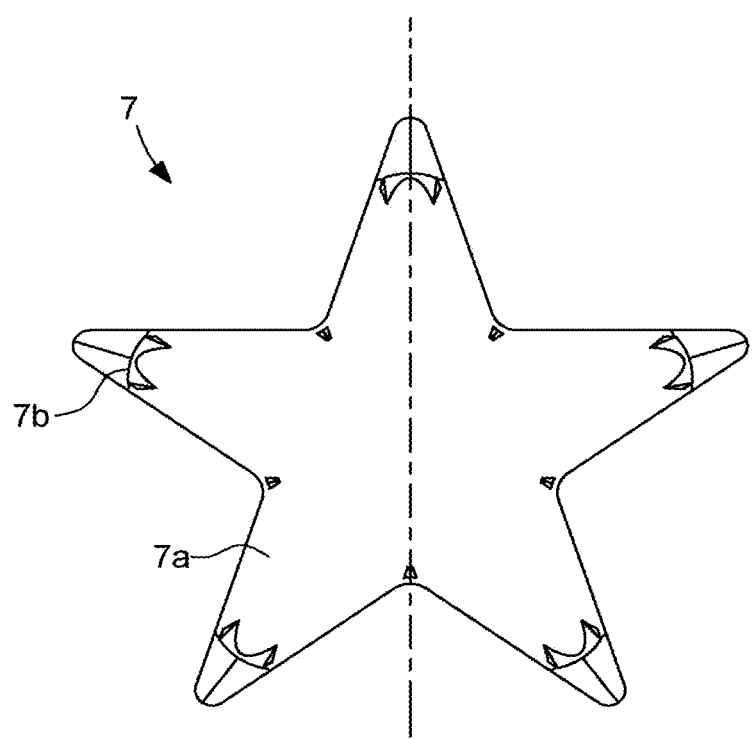
FIGS. 10 to 12 respectively represent a top view, a side view and a perspective view of the setting intended to receive the gemstone according to the invention.
Figure 11:
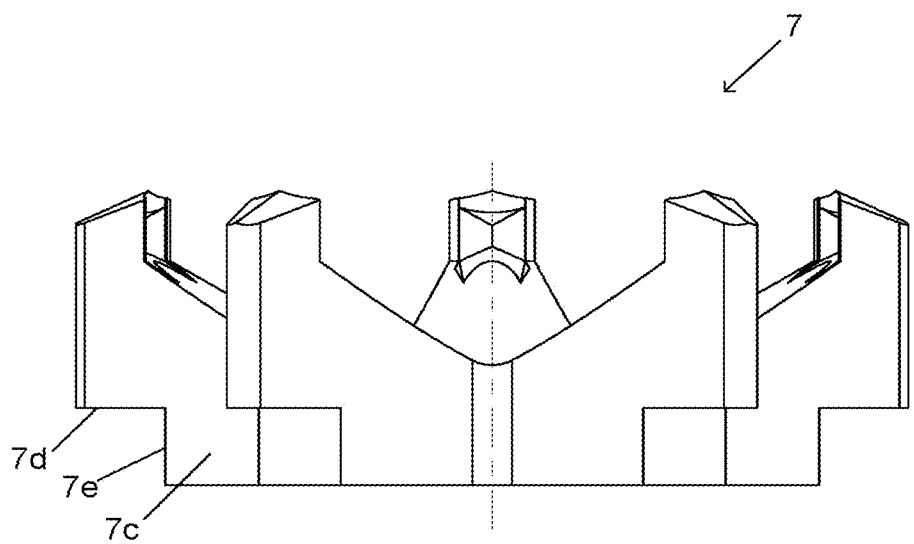
Figure 12:
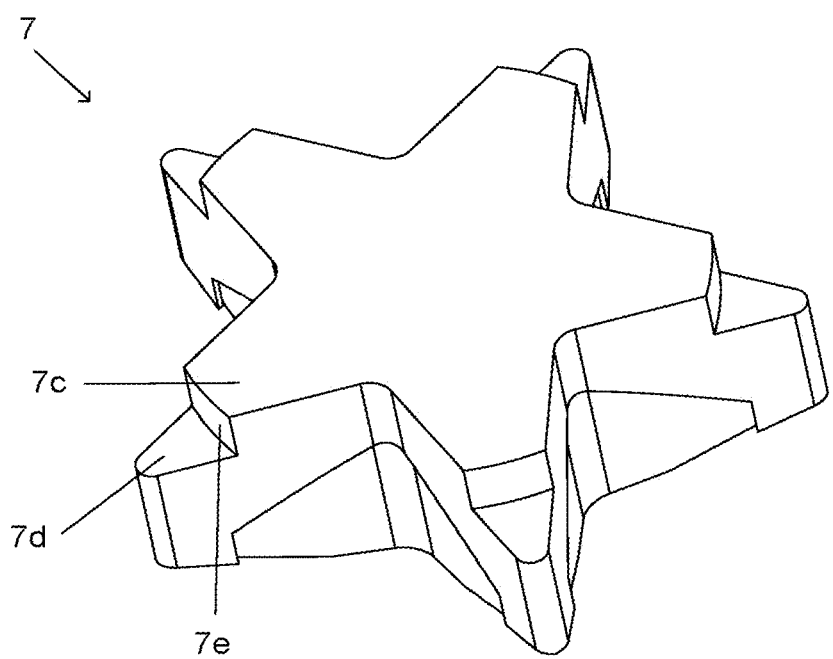
Figure 13:
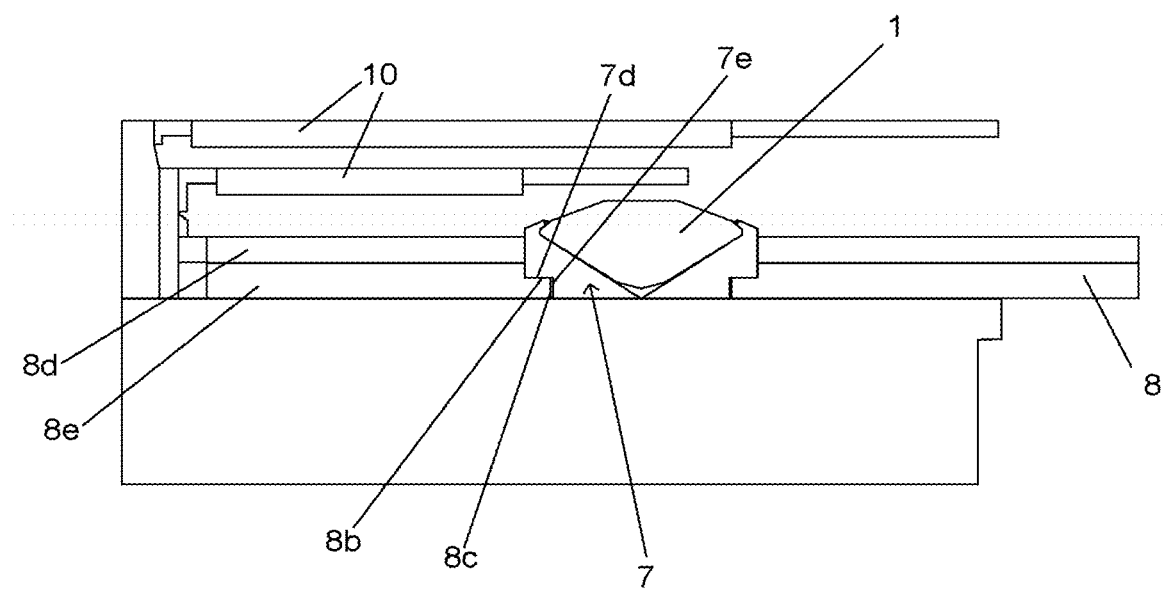
FIG. 13 is a half section at 6 o'clock of one portion of a timepiece comprising the diamond of the invention set in the dial.

The diamond thus obtained is set in a setting intended to be housed inside an aperture made in the dial. According to the invention, the setting 7 seen in FIGS. 10 to 12 comprises a star-shaped housing 7a with 5 arms offset by 108° for receiving the diamond. The diamond is set inside the setting by folding prongs 7b of the setting over the ends of the arms of the diamond. Setting 7 has a base 7C in the shape of a 5 arm star, whose ends are truncated creating? a step formed of two contact surfaces 7d and 7e intended to be bonded inside aperture 8a provided in dial 8. Aperture 8a has a star-shaped contour that can be seen in FIG. 14. The contour is of complementary shape to the setting, with a step for each arm acting, on the one hand, as a bearing surface 8b on which contact surface 7d of the setting rests and, on the other hand, as contact surfaces 8b, 8c for the adhesive bonding (FIG. 13). The setting is secured to the dial by adhesive bonding on contact surfaces 7d, 7e, 8b, 8c. The adhesive joint is thus positioned in the lower portion of the dial. In particular, in the illustrated example, dial 8 is formed of two layers comprising an external mother-of-pearl layer 8d, which is the visible layer, and an inner metal layer 8e, the adhesive joint being confined in the metal layer of the dial. According to the invention, the base of the setting is in the plane of the underside of the dial in order to maximise the height available for arranging the gemstone. In the illustrated example, the distance between the underside of the dial and the hour hand is 1.1 mm. To allow for passage of the hands, the distance between the table of the diamond and the hour hand must be a minimum of 0.07 mm. Consequently, the height of the diamond must be a maximum of 1.03. For a dial thickness of 0.6 mm, the diamond thus projects from the upper face of the dial by a maximum of 0.43 mm.

Figure 14:
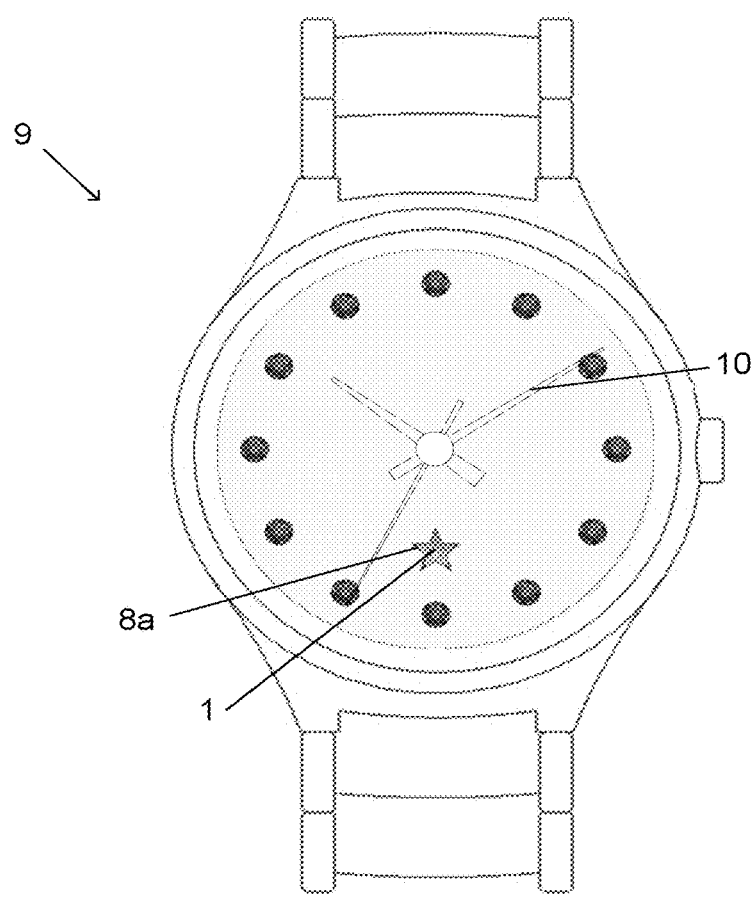
FIG. 14 is a plan view of the watch comprising the dial furnished with the set gemstone according to the invention.

Finally, FIG. 14 represents the watch 9 provided with dial 8 set with diamond 1 according to the invention.

KEY TO THE FIGS (1) Gemstone, and particularly a diamond, obtained by the method of the invention
(1') Basic gemstone
(2) Arm of the star
(3) Pavilion of the gemstone obtained by the method of the invention
(3') Pavilion of the basic gemstone
(4) Crown of the gemstone obtained by the method of the invention
(4') Crown of the basic gemstone
(5) Table of the gemstone obtained by the method of the invention
(5') Table of the basic gemstone
(6) Girdle of the gemstone obtained by the method of the invention
(6') Girdle of the basic gemstone
(7) Setting
  a. Housing
  b. Prong
  c. Base
  d. First contact surface
  e. Second contact surface
(8) Dial
  a. Aperture
  b. Bearing surface or first contact surface
  c. Second contact surface
  d. External mother-of-pearl layer of the dial
  e. Internal metal layer of the dial
(9) Watch
(10) Hands

What is claimed is:
1. A gemstone comprising:
a crown surmounted by a table;
a pavilion; and
a girdle at an intersection of the crown and the pavilion, wherein said gemstone is cut in the form of a star with several arms, a height between the table and a free end of the pavilion being less than 2 mm, wherein the table is in the shape of a pentagon, and wherein the gemstone further comprises a first series of five facets, each of the five facets having at least a first side and a second side, the first side of each of the five facets sharing a respective side with the pentagon, the second side of each of the five facets is located opposite the first side and an entire length of the second side is connected to the girdle;

a second series of five rhombus facets each sharing a vertex with a vertex of the pentagon and sharing two sides with adjacent facets of the first series;

a third series of ten triangular facets each sharing one side with a rhombus facet of the second series;

a fourth series of five quadrangular facets each sharing a vertex with a respective rhombus facet of the second series and sharing two sides with adjacent triangular facets of the third series; and each of the several arms includes a free end, each of the free ends is formed only by a respective quadrangular facet of the fourth series, and each free end is double beveled to facilitate setting the gemstone without risk of breaking the ends.

2. The gemstone according to claim 1, wherein the several arms includes five arms of the same dimensions offset by 108°.

3. The gemstone according to claim 1, wherein a length between one end of a first arm of the several arms and a midpoint between ends of two arms of the several arms that are opposite the first arm is between 1 and 3 mm.

4. The gemstone according to claim 1, comprising, in addition to the table, 20 or 25 facets in the crown and 25 facets in the pavilion.

5. The gemstone according to claim 1, comprising, at the center of the pavilion, two concentric stars visible through the table.

6. A dial comprising an aperture delimiting a contour in the shape of star with several arms, said aperture receiving a setting for setting the gemstone according to claim 1.

7. The dial according to claim 6, wherein the aperture further includes a step forming a bearing surface for the setting at a periphery of each of the several arms of the aperture.

8. The dial according to claim 6, comprising a mother-of-pearl layer that surrounds the setting and is externally visible.

9. The dial according to claim 6, comprising the gemstone and the setting.

10. A setting comprising a housing in the shape of a star with several arms intended for setting the gemstone according to claim 1.

11. The setting according to claim 10, comprising a base surmounted with said housing, the base having a star shape with truncated arms delimiting a contact surface intended to rest on a dial.

12. A watch including the dial according to claim 6.

13. The watch according to claim 12, comprising the setting, said setting being secured to the dial by an adhesive joint and resting in a plane formed by an inner face of the dial.

\* \* \* \* \*